United States Patent [19]

Chen

[11] Patent Number: 5,197,503
[45] Date of Patent: Mar. 30, 1993

[54] MOTORCAR SUN-SHADE

[76] Inventor: Y. L. Chen, No. 18, Lane 123, Sec. 2, Sing Sheng N. Rd., Taipei, Taiwan

[21] Appl. No.: 759,232

[22] Filed: Sep. 13, 1991

[51] Int. Cl.$^5$ .............................................. E04H 15/06
[52] U.S. Cl. .................................... 135/88; 135/97; 135/112; 403/403; 248/206.3
[58] Field of Search ................. 135/88, 90, 97, 106, 135/112, 95, 96; 248/467, 206.2, 206.5, 206.3; 403/403, 382, 205

[56] References Cited

U.S. PATENT DOCUMENTS

| | | | |
|---|---|---|---|
| 1,818,172 | 8/1931 | Sutherland | 403/205 |
| 1,836,060 | 12/1931 | Barnes | 135/88 |
| 2,608,942 | 9/1952 | Smith | 135/88 X |
| 2,972,377 | 2/1961 | Jacobs | 135/90 X |
| 3,068,046 | 12/1962 | Bourgoin | 135/90 X |
| 4,684,165 | 8/1987 | Becker | 135/88 X |
| 4,944,321 | 7/1990 | Moyet-Ortiz | 135/95 X |

*Primary Examiner*—Richard E. Chilcot, Jr.
*Assistant Examiner*—Lan M. Mai
*Attorney, Agent, or Firm*—Bacon & Thomas

[57] ABSTRACT

A motorcar sun-shade comprising a covering supported on the body of a motorcar by two opposite supporting frames, the covering comprised of a main panel covering over the top of the body of said motor car and two side panels attached to said main panel at two opposite sides by hook and loop bands for covering the two opposite sides of the body of said motorcar, the supporting frames each comprising two parallel extension rods attached to said main panel and secured to the body of said motorcar by suction discs, the parallel extension rods being collapsibly connected together by two link assemblies, the link assemblies each comprising and angle connector attached to either side of said motorcar by a suction disc and two connecting rods connected to said parallel extension rods by hinges.

1 Claim, 6 Drawing Sheets

MOTORCAR SUN-SHADE

BACKGROUND AND SUMMARY OF THE INVENTION

The present invention relates to sun-shades and relates more particularly to a motorcar sun-shade which is easy to install and durable in use and, which provides satisfactory heat-isolating effect.

Various manual and motor-operated motorcar covers and sun-shades have been known for protecting motorcars against direct sunlight. These motorcar covers and sun-shades are not satisfactory in use because they are not easy to install and may occupy much space when not in use. There is still disclosed a parasol type of motorcar sun-shades which can be conveniently stretched to open for protecting a motorcar against direct sunlight. However, this structure can not cover the whole body of a motorcar, and therefore, it can not effectively protect a motorcar against the heat from the sun. Further, the conventional motorcar covers or sunshades may be displaced or moved away by a strong wind easily to lose its effectiveness.

The present invention has been accomplished to eliminate the aforesaid disadvantages. It is therefore the main object of the present invention to provide a motorcar sun-shade for protecting a motorcar against direct sunlight which is inexpensive to manufacture, easy to install on a motorcar and durable in use and, which occupies less space when not in use and provides good heat isolating effect.

DETAILED DESCRIPTION OF THE PREFERRED EMBODIMENT

Figure 1:
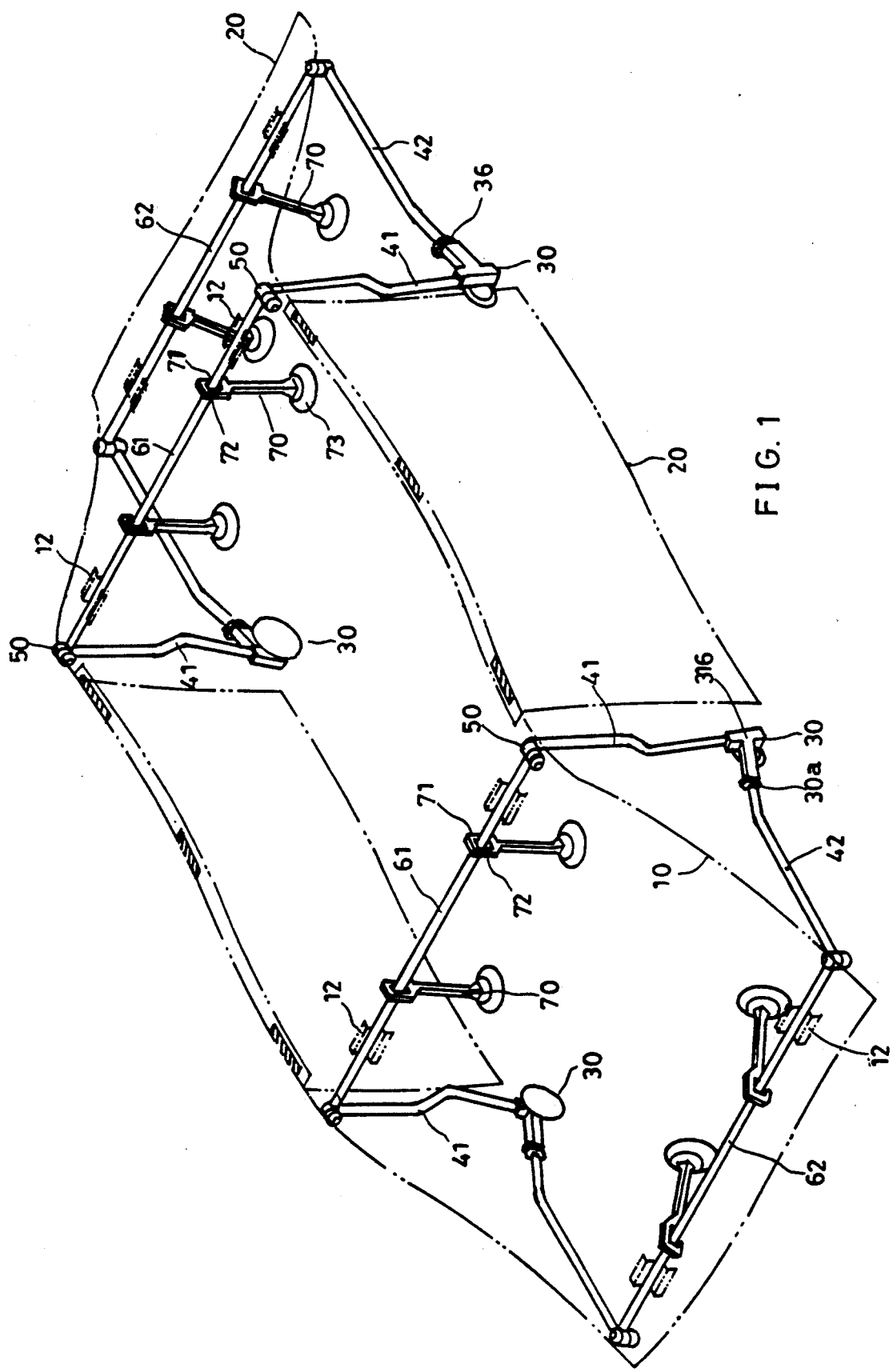
FIG. 1 is a perspective view of the preferred embodiment of the motorcar sun-shade of the present invention.
Figure 2:
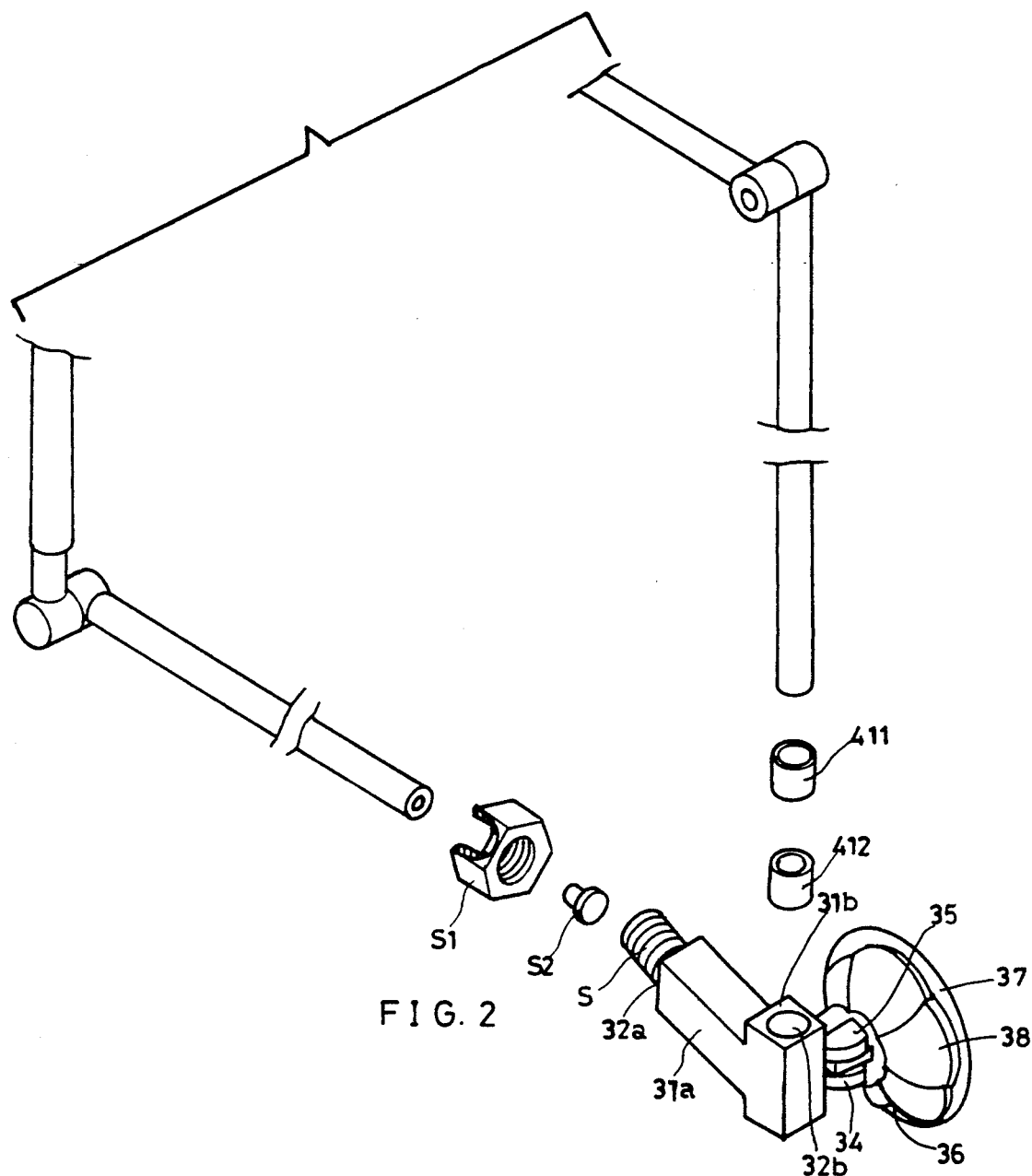
FIG. 2 illustrates the structure of the angle connector for connecting the connecting rods.

Referring to FIGS. 1 and 2, a motorcar sunshade as constructed in accordance with the present invention is generally comprised of main and auxiliary panels 10, 20, and front and rear supporting frames 30a, 30b. The main panel 10 is made from a rectangular piece of weatherproof cloth for covering over the top and the front and rear windows of a car, having hook and loop bands 11 on the two opposite side edges thereof at the middle. The auxiliary panels 20 are respectively attached to the main panel 10 at two opposite sides for covering the side windows of said car, each of which has hook & loop bands 21 one the peripheral edge thereof corresponding to the hook and loop bands 11 on the main panel 10.

Figure 5:
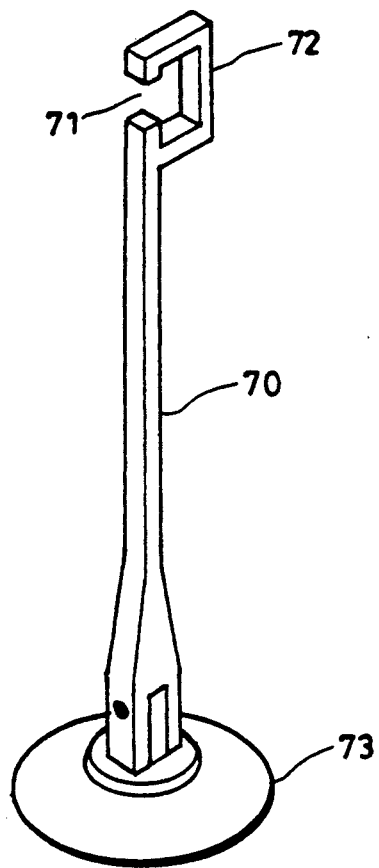
FIG. 5 is a perspective view of the fastening member.
Figure 6:
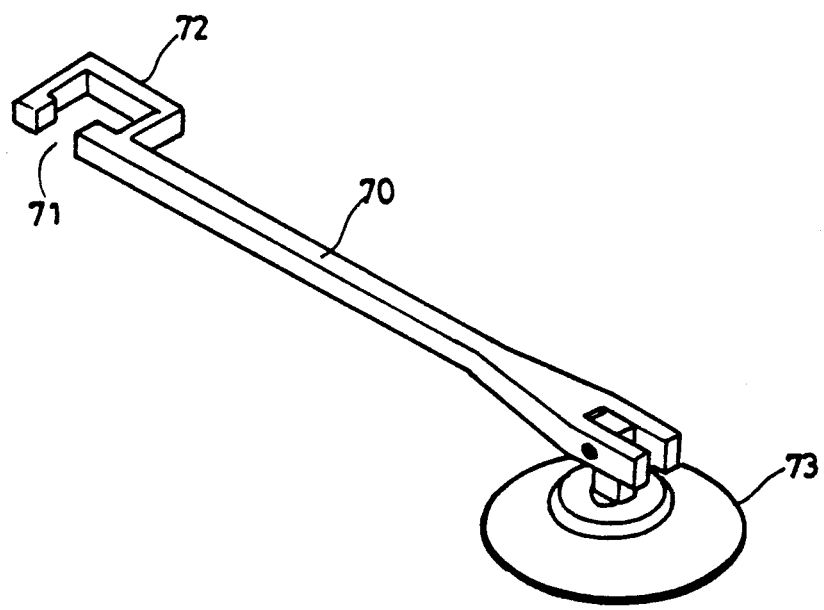
FIG. 6 illustrates that the fastening member can be rotated on the suction disc thereof during installation.

The front and rear supporting frames 30a, 30b are similar in structure, each of which comprising two angle connectors 30, two pairs of connecting rods 41, 42, and two extension tubes 61, 62. The connecting rods 41, 42 are respectively connected to the two angle connectors 30 at two opposite ends, and the two extension tubes 61, 62 which may be made from hollow or solid plastic rods are disposed in parallel with each other and respectively connected to the connecting rods 41, 42 by hinges 50, wherein the extension tubes 61, 62 each has a plurality of fastening members 70 attached thereto for securing the supporting frame 30a or 30b to a car. As illustrated, each angle connector 30 comprises two sockets 31a, 31b at right angles each of which having a plug hole 32a or 32b, wherein the socket 31b has a pivot coupler 34 on the outer wall surface thereof for securing a suction disc 37 by a link 36 and a pressure disc 38, which pivot coupler 34 has a stop flange 35 formed thereon. As shown in FIGS. 1 and 5, each fastening member 70 comprises a hook 72, which defines therein a retaining hole 71, and a suction disc 73.

Referring to FIG. 1 again, the main panel 10 further comprises a plurality of spaced pairs of loops 12 on the bottom surface thereof at suitable locations for the insertion therethrough of the extension tubes 61, 62 respectively.

Figure 3:
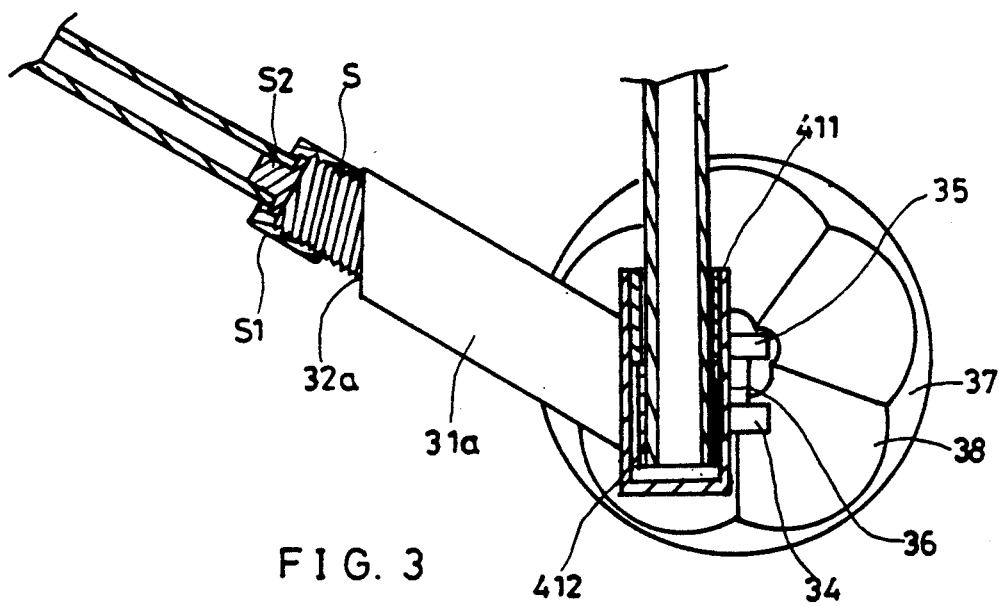
FIG. 3 is a perspective and partly sectional assembly view showing the connection of the connecting rods to the angle connector.

As indicated, each angle connector 30 is provided for connecting two connecting rods 41, 42, wherein the plug hole 32b on the socket 31b is for fastening the first connecting rod 41 which is revolvably retained in the socket 31b by a bush 411 and a retainer ring 412; the plug hole 32a on the socket 31a is fastened with a screw rod S for fastening the second connecting rod 42 by a lock nut S1 and a rivet S2 (see FIGS. 2 and 3).

Figure 4:
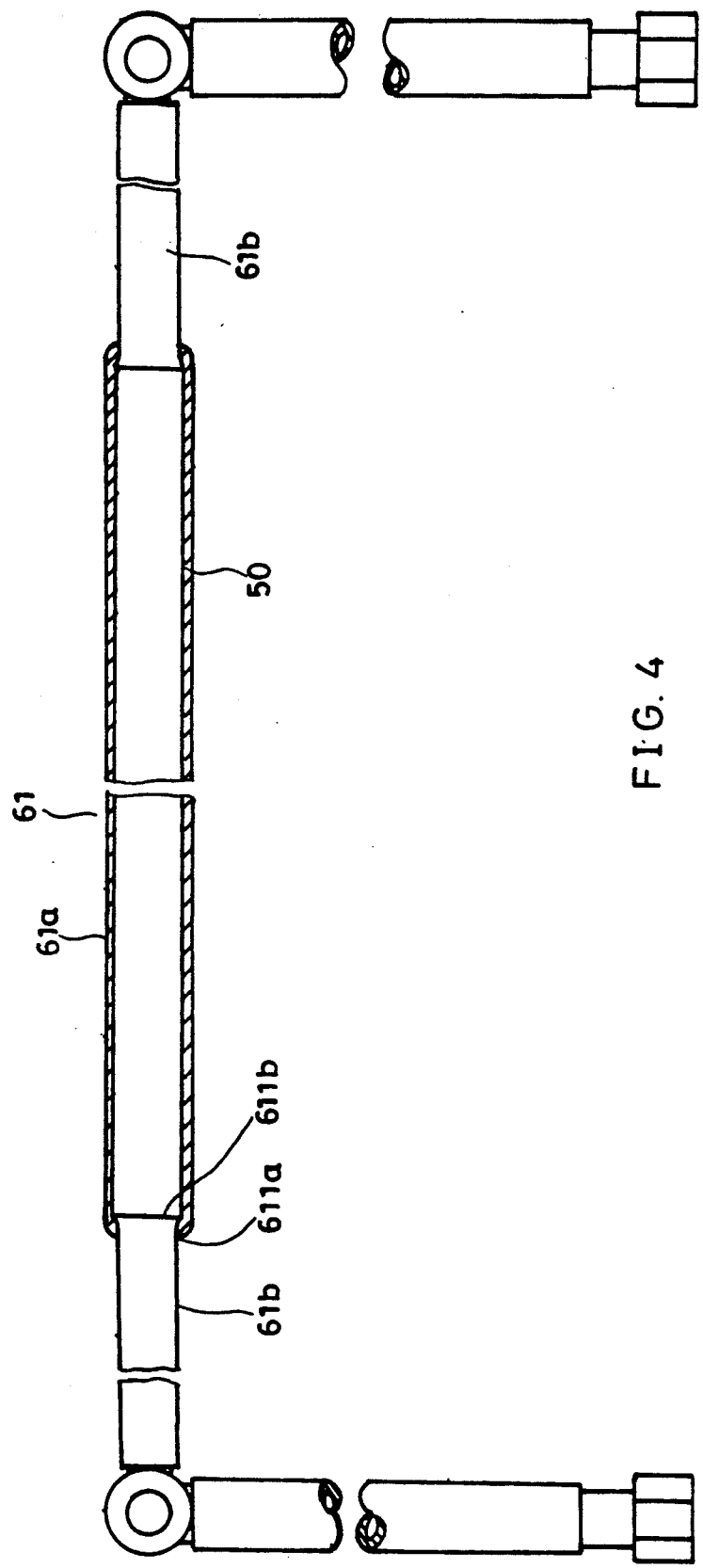
FIG. 4 illustrates the structure of the extension tube and its connection to the connecting rods.

As shown in FIG. 4, the extension tubes 61, 62 each is comprised of a main tube 61a or 62a at the middle and two auxiliary tubes 61b or 62b inserted in said main tube 61a or 62a at two opposite ends, wherein said main tube 61a or 62b has two opposite peripheral end edges 611a respectively projecting inwards at two opposite ends; said auxiliary tube 61a or 62b has a peripheral end edge 611b projecting outwards at one end and retained inside said main tube 61a or 62a by either of the two opposite peripheral end edges 611a of said main tube 61a or 62a. Therefore, the two auxiliary tubes 61b or 62b are permitted to slide in the main tube 61a or 62a and will not disconnect therefrom.

Installation of the present invention is simple and outlined hereinafter. Attach the angle connectors 30 to a car's four door window glasses respectively by means of the suction discs 37 thereof, permitting the first socket 31b of each angle connector to be vertically disposed upwards (and therefore, the second socket 31a will be automatically disposed in a bevel position as shown in FIGS. 2 and 3.). Then, turn the pivot coupler 34 of each angle connector in such a direction that the stop flange 35 squeezes the pressure disc 38 against the suction disc 37 (as shown in FIGS. 2 and 3), and therefore, the suction disc 37 is firmly secured to a door window glass. As soon as the connecting rods 41, 42 are respectively inserted in the angle connectors 30, the main panel 10 is stretched to spread out. Then, turn the hinges 50 through 90° angle permitting the extension tubes 61, 62 to be disposed at right angles relative to the connecting rods 41, 42 respectively and then, fasten the extension tubes 61, 62 in the retaining holes 71 of the hooks 72 of the fastening members 70 respectively (which fastening members 70 have been secured to the front and rear window glasses at suitable locations). At final, the side panels 20 are respectively attached to the main panel 10 at two opposite sides by means of the hook and loop bands 11, 21. The aforesaid procedure is performed reversely when the sun-shade is to be detached from the car.

As indicated, the present invention is convenient to install. Once it is fastened in a car, it is firmly retained in place against weather. Further, the main and auxiliary panels 10, 20 are supported by the front and rear supporting frames 30a, 30b on the body of a car with a space defined therebetween for the circulation of air, and therefore, the car is protected against the heat from direct sunlight.

What is claimed is:

1. A motorcar sun-shade comprising a covering supported on the body of a motorcar by a supporting frame assembly, said covering comprised of a main panel covering over the top of the body of said motor car and two side panels attached to said main panel at two opposite sides by hook and loop bands for covering the two opposite sides of the body of said motorcar, said supporting frame assembly comprised of a front supporting frame and a rear supporting frame, said front and rear supporting frames each comprising two parallel extension tubes connected at two opposite ends by two link assemblies, said two parallel extension tubes being respectively attached to said main panel at the bottom by loops and secured to the body of said motorcar by fastening members, and characterized in that:

said two parallel extension tubes each is comprised of a main tube at the middle and two auxiliary tubes inserted in said main tube at two opposite ends, said main tube having two opposite peripheral end edges respectively projecting inwards at two opposite ends, said auxiliary tubes each having a peripheral end edge projecting outwards at one end and retained by the peripheral end edge at either end of said main tube; and said link assemblies each is comprised of a first connecting rod, a second connecting rod and an angle connector, said first connecting rod having one end connected to one of the two parallel extension rods at one end by a hinge and an opposite end connected to said angle connector at one end, said second connecting rod having one end connected to the other parallel extension rod at one end by a hinge and an opposite end connected to said angle connector at an opposite end, said angle connector comprising a first socket at one end for revolvably fastening said first connecting rod by a bush and a retainer ring, a second socket at right angle relative to said first socket with a screw rod fastened therein for connecting said second connecting rod by a lock nut and a rivet, and a pivot coupler on the outer wall surface thereof for securing a suction disc by a link and a pressure disc.

* * * * *